United States Patent [19]

White, III et al.

[11] Patent Number: 5,749,148
[45] Date of Patent: May 12, 1998

[54] FILAMENT TRIMMER HEAD

[75] Inventors: Donald M. White, III, Chanhassen; Chris A. Wadzinski, Plymouth, both of Minn.

[73] Assignee: The Toro Company, Minneapolis, Minn.

[21] Appl. No.: 469,105

[22] Filed: Jun. 6, 1995

Related U.S. Application Data

[62] Division of Ser. No. 172,010, Dec. 22, 1993.

[51] Int. Cl.⁶ ............................ A01D 34/67; B26B 27/00
[52] U.S. Cl. .................................................. 30/276; 56/12.7
[58] Field of Search ...................... 30/276, 347; 56/12.7

[56] References Cited

U.S. PATENT DOCUMENTS

| | | |
|---|---|---|
| 4,020,552 | 5/1977 | Mizuno. |
| 4,052,789 | 10/1977 | Ballas. |
| 4,151,646 | 5/1979 | Lane. |
| 4,183,138 | 1/1980 | Mitchell. |
| 4,185,381 | 1/1980 | Palmieri et al.. |
| 4,211,005 | 7/1980 | Woods. |
| 4,236,309 | 12/1980 | Cayou. |
| 4,349,962 | 9/1982 | Itagaki et al.. |
| 4,419,822 | 12/1983 | Harris. |
| 4,524,515 | 6/1985 | Oberg. |
| 4,584,771 | 4/1986 | Tillotson. |
| 4,672,798 | 6/1987 | Ota. |
| 4,916,886 | 4/1990 | Nakamura et al.. |
| 4,959,904 | 10/1990 | Proulx ............................ 30/347 X |
| 5,109,607 | 5/1992 | Everts ............................ 30/347 X |

*Primary Examiner*—Eugenia Jones
*Attorney, Agent, or Firm*—James W. Miller

[57] ABSTRACT

A filament trimmer has an improved trimmer head. The trimmer head includes a spool having crush ribs on its core to prevent contraction of the filament line from warping or otherwise damaging the spool. A slot shaped exit aperture is provided in the head which can be opened up when the head is disassembled to allow the filament line to be more easily placed therein, but which will be closed when the head is fully assembled and will constrain the line against excessive vertical movement. The head includes a line indexing system for feeding out additional line in which one of the groups of the conventional teeth in such system are vertically spaced away from the spool flanges and are placed on a spool core extension. A dirt seal is provided to help prevent from passing around the ground engaging member of the indexing system. Finally, the head includes a self threading drive shaft that forms the attachment threads for the head into the head when the head is threaded onto the drive shaft.

8 Claims, 5 Drawing Sheets

FILAMENT TRIMMER HEAD

This application is a division of application Ser. No. 08/172,010, filed Dec. 22, 1993, pending.

TECHNICAL FIELD

This invention relates to a filament trimmer having a filament line that is spun about a rotational axis to sever grass, weeds or other vegetation. More particularly, this invention relates to the rotatable head that stores a supply of filament line on a spool and to the indexing means for periodically rotating the spool relative to the head to feed additional line out from the head.

BACKGROUND OF THE INVENTION

Filament trimmers are well known products that are used to trim grass, weeds, or similar vegetation. They comprise an elongated handle assembly having a hand grip at the upper end and a trimmer head rotatably mounted at the lower end. The trimmer head includes a spool that carries a coiled supply of filament line with a free end of this line extending radially outwardly from the head. When a motor carried on the trimmer is activated, the head is rotated to spin the free end of the line about the rotational axis of a drive shaft to allow the free end of the line to sever grass, weeds and the like.

Despite the relatively well developed nature of these products, the filament trimmers existing today have various flaws. For example, the spools which carry the coiled supply of the line are typically molded from plastic with the spools having a cylindrical central core on which the line is wound. However, the filament line is sensitive to environmental conditions, and particularly to the humidity of the ambient air, and can expand and contract with changes in these conditions. When the line contracts on the core, it can in some instances impose enough of a compressive force on the core to warp or damage the spool. This can cause the spool to no longer operate properly or at all, which is a disadvantage.

The filament line carried on the spool typically extends outwardly from the spool through an exit aperture in a peripheral sidewall of the head. It can be difficult to thread the line through this aperture during installation of the spool due to the tight spaces found inside the head. Some trimmers have attempted to solve this problem by providing an exit aperture that can be opened up to allow the line to be laid into the aperture when various parts comprising the head are disassembled, but is otherwise closed when the head is in its assembled state. This approach is shown in U.S. Pat. No. 4,672,798 to Ota. However, the exit aperture in this approach is typically formed as an elongated U-shaped slot that is quite long and which does not constrain the line against vertical movement as well as the generally circular exit aperture which it replaces This allows the line to move too much inside the aperture, leading to melting of the line at the aperture due to friction or to breaking of the line from abrasion.

Most filament trimmer heads have an indexing system for feeding out additional line to replenish the cutting length whenever the line has become shortened due to wear or breakage. Many of these systems operate by normally locking the spool relative to the head. However, when more line is required, the spool is unlocked to allow the spool to rotate relative to the head, thereby feeding out more line from the spool and thus extending the cutting length. In one indexing system of this type, the unlocking of the spool is initiated by bumping the trimmer head, and specifically a downwardly protruding ground engagement member on the head, against the ground. Such a ground bump indexing system is shown in U.S. Pat. No. 4,524,515 to Oberg, which is assigned to The Toro Company, the assignee of this application.

Ground bump indexing heads have an opening provided therein to allow the ground engagement member to protrude out of the head. This opening, which normally faces the ground, provides an entry point into the interior of the head for dirt, sand, grit and the like. If the trimmer is operated in dirty environments where a lot of particulate material is present, the inside of the trimmer head can become so contaminated that the indexing system either no longer works reliably or can be damaged. This requires the trimmer head to be disassembled for cleaning or potentially requires some of the components of the indexing system to be repaired or replaced.

In addition, most line indexing systems, including ground bump indexing systems, have various sets of teeth that engage with one another to lock the spool relative to the head. Some of these teeth are provided on the head and some on the spool. The most economical way of providing teeth on the spool is to mold such teeth integrally into the spool. This is most often done by molding such teeth into the upper face of one of the spool flanges or into the peripheral edge of one or more of the spool flanges, as shown in U.S. Pat. No. 4,349,962 to Itagaki et al.

However, if the spool flanges warp even slightly and become distorted from their normal horizontal orientation, the teeth carried on the spool flanges may not reliably engage the teeth provided on the head. This leads to imperfect and unreliable operation of the indexing system. In addition, outwardly extending teeth on the peripheral edge of the spool flange unnecessarily increases the diameter of the spool, and thus the diameter of the head, and potentially serve as obstructions that can catch the line extending out from the spool.

Finally, most filament trimmer heads are mounted onto the motor shaft by being threaded onto that shaft. If the threads provided in the head are integrally molded into the head, the cycle times for molding the head are considerably reduced, leading to a more expensive head. If the threads are provided in a separate metallic insert, the cost of the insert, and the cost to mold it in place into the head, must also be borne. Moreover, in an electric trimmer, this threaded metallic insert has to be molded into a separate plastic part to electrically insulate it. Thus, these two prior art methods of providing attachment threads in filament trimmer heads for securing the head to the motor shaft are relatively expensive. A less expensive way of attaching the trimmer head to the motor shaft is desirable.

SUMMARY OF THE INVENTION

This invention provides an improved filament trimmer head in which various of the above-noted problems have been solved, to thereby yield a trimmer head of improved reliability and ease of use, while decreasing the cost to manufacture the head. A filament retention means is carried inside the head for retaining a supply of filament line with a free end of the line extending radially outwardly from the filament retention means through an exit aperture in the head to form a cutting length of line located exteriorly of the head. A drive means is provided for rotating the trimmer head about an axis to cause the cutting length of line to be spun in a cutting plane to sever grass or other vegetation.

One aspect of this invention is to provide means carried on the filament retention means for absorbing compressive forces caused by contraction of the wound filament line on the core. This means desirably comprises a plurality of crush ribs.

Another aspect of this invention is an improved exit aperture located in the peripheral sidewall of the head. The exit aperture is selectively openable to allow the line to be placed into the aperture and is selectively closable around the line after the line is placed into the aperture. The aperture in its selectively openable condition comprises an open-ended slot having a length substantially greater than a predetermined thickness of the line to allow the line to be easily inserted therein and in its selectively closable condition comprises an aperture that is generally enclosed around the line having a length that is substantially less than the length of the open-ended slot to help constrain movement of the line within the aperture.

Yet another aspect of the invention relates to a trimmer head incorporating indexing means for feeding additional line out from the filament retention means. In the indexing means contemplated by this invention, the trimmer head includes an opening carried in a bottom face of the trimmer head. An indexing member extends downwardly through the opening to be capable of being engaged against the ground with such ground engagement being effective to actuate the indexing means to feed out additional line. A dirt seal extends radially inwardly from the opening to terminate in a radially innermost edge that is spaced from but is located adjacent the indexing member, the seal being sized to decrease the size of the gap between the opening and the indexing member to aid in the prevention of the passage of dirt or other particulate matter through the gap and into the head.

Another aspect of this invention relates to a trimmer head having an indexing means comprising first and second groups of generally conventional indexing and locking teeth that move relative to one another along the axis of rotation during a line indexing operation. In such a head, a spool is used to store the line supply. The spool core includes a core extension that protrudes to one side past the spool flanges such that the core extension is located vertically outside of the line storage area of the spool. One of the two groups of teeth in the indexing means is carried on the core extension and is vertically spaced from the closest spool flange.

A final aspect of this invention relates to an attachment means for attaching the trimmer head to a drive shaft for rotating the same. This means comprises a smooth sided cylindrical bore formed in the trimmer head during manufacture thereof having a predetermined nominal inner diameter. A lower end to the drive shaft is suited to be threaded into the bore. The drive shaft lower end comprises a threaded section that includes thread forming screw threads having a predetermined nominal outer diameter sufficiently larger than the inner diameter of the bore to allow the threaded section to form threads in the trimmer head simultaneously with the shaft being threaded into the bore with such threads being sufficient to thereafter hold the trimmer head in place on the drive shaft during operation of the trimmer.

BRIEF DESCRIPTION OF THE DRAWINGS

This invention will be described more completely hereafter in the Detailed Description, when taken in conjunction with the following drawings, in which like reference numerals refer to like elements throughout.

FIG. 5 is a cross-sectional view of the spool of the filament trimmer head shown in FIG. 1, taken along lines 5—5 of FIG. 4, particularly illustrating the crush ribs provided on the spool core for absorbing radially inward compressive forces on the spool core caused by contraction of the line on the spool core;

DETAILED DESCRIPTION

Figure 1:
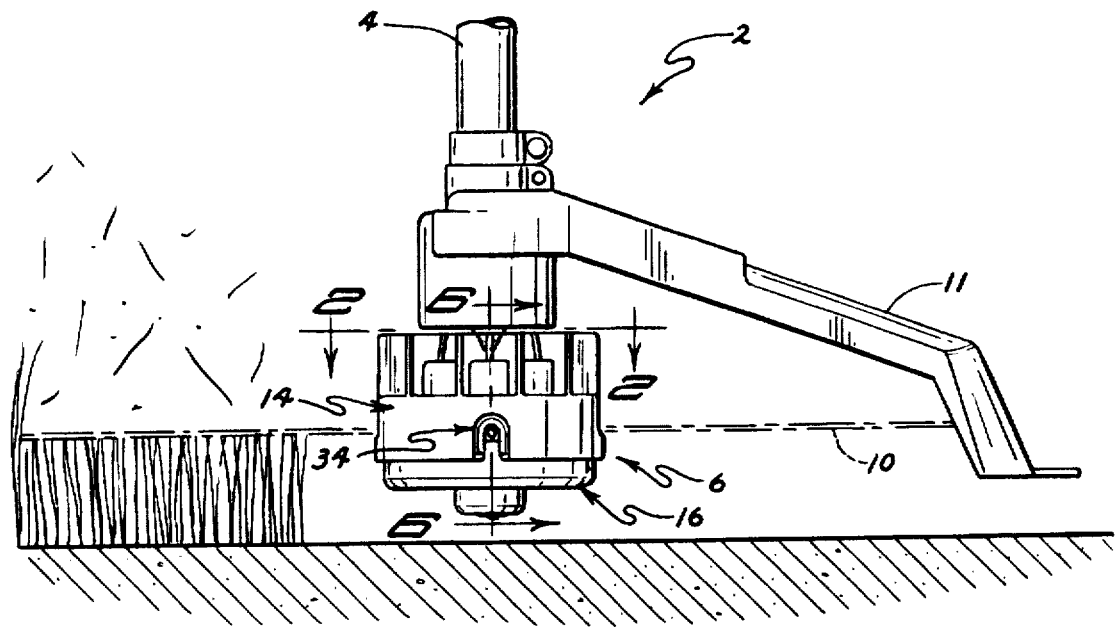
FIG. 1 is a side elevational view of a portion of a filament trimmer particularly illustrating the filament trimmer head of this invention.

Referring first to FIG. 1, a portion of a filament trimmer of the type well known in the art, specifically the lower portion of the trimmer, is generally illustrated as 2. Trimmer 2 includes a handle assembly 4 that rotatably mounts a trimmer head 6 at the lower end thereof adjacent the ground. Trimmer head 6 houses a means for retaining a supply 9 of filament line 8 such that a cutting length of line, identified as 10, extends radially outwardly from head 6 when head 6 is rotated by operation of a motor or engine (not shown) carried on trimmer 2. When such rotation occurs, cutting length 10 is made rigid by centrifugal force and is effective to sever grass, weeds, and the like at whatever height is determined by how closely the user positions head 6 adjacent the ground. Trimmer 2 includes a protective shield 11 between the user and cutting length 10 of line 8.

The means for retaining the filament line supply 9 comprises a storage spool 12 contained inside head 6. This invention relates to various improvements to head 6 and spool 12 that solve the various problems existing in prior art devices as discussed in the Background of the Invention section of this application. One of these improvements relates to how trimmer head 6 is attached to the drive shaft used to rotate head 6. Other than for a specific type and shape to the lower end of this drive shaft, trimmer head 6 can be used on any filament trimmer, including any electric trimmer or any gasoline engine powered trimmer. Consequently, the structure of trimmer 2, except for the type and shape of the lower end of the drive shaft, is not important to this invention and is not specifically illustrated in the drawings.

The Trimmer Head
The Two-Part Construction

Trimmer head 6 is made in two parts that are separably joined together to form a complete trimmer head. These parts may be quickly detached from one another and quickly reconnected to one another to allow the user to easily remove and replace spool 12 inside trimmer head 6. This needs to be done to repair or replace a damaged spool 12, to wind more line on a spool 12 that has exhausted its prior line supply 9, to replace the entire spool 12 with a new spool 12 having a fresh supply 9 of line, to straighten out tangled line, etc. It is obviously desirable to provide the user with easy access to spool 12 inside trimmer head 6 so that these and similar tasks are easy to accomplish.

Figure 6:
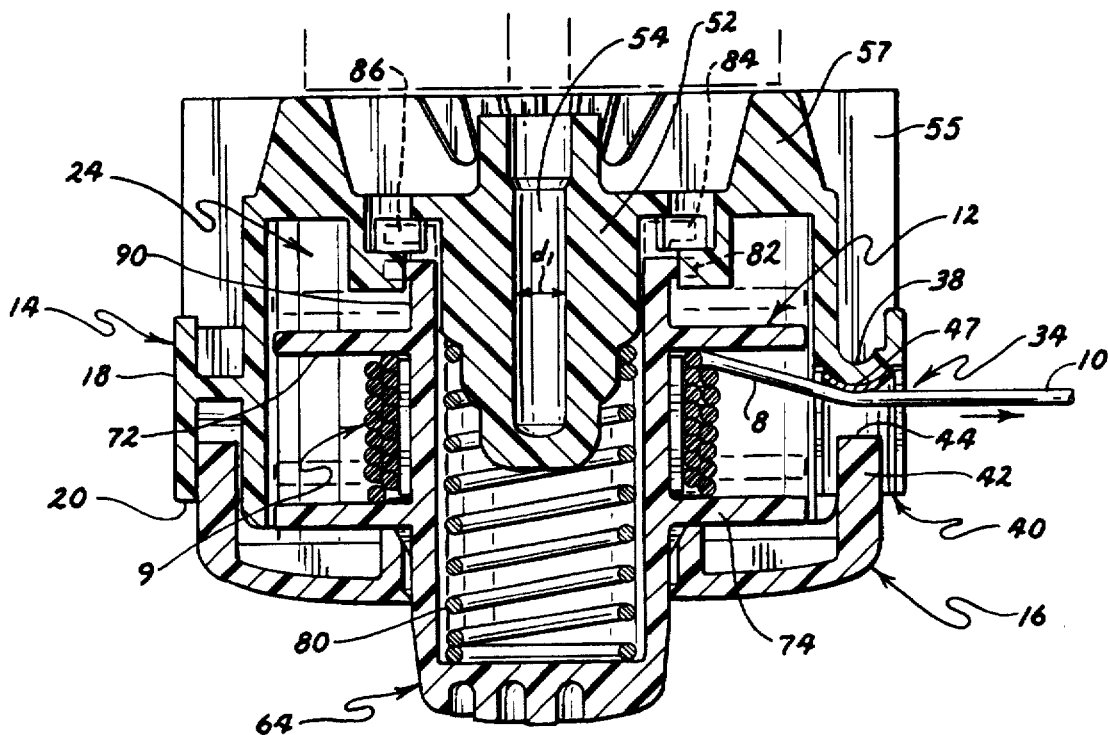
FIG. 6 is a cross-sectional view of the filament trimmer head shown in FIG. 1, taken along lines 6—6 in FIG. 1.
Figure 4:
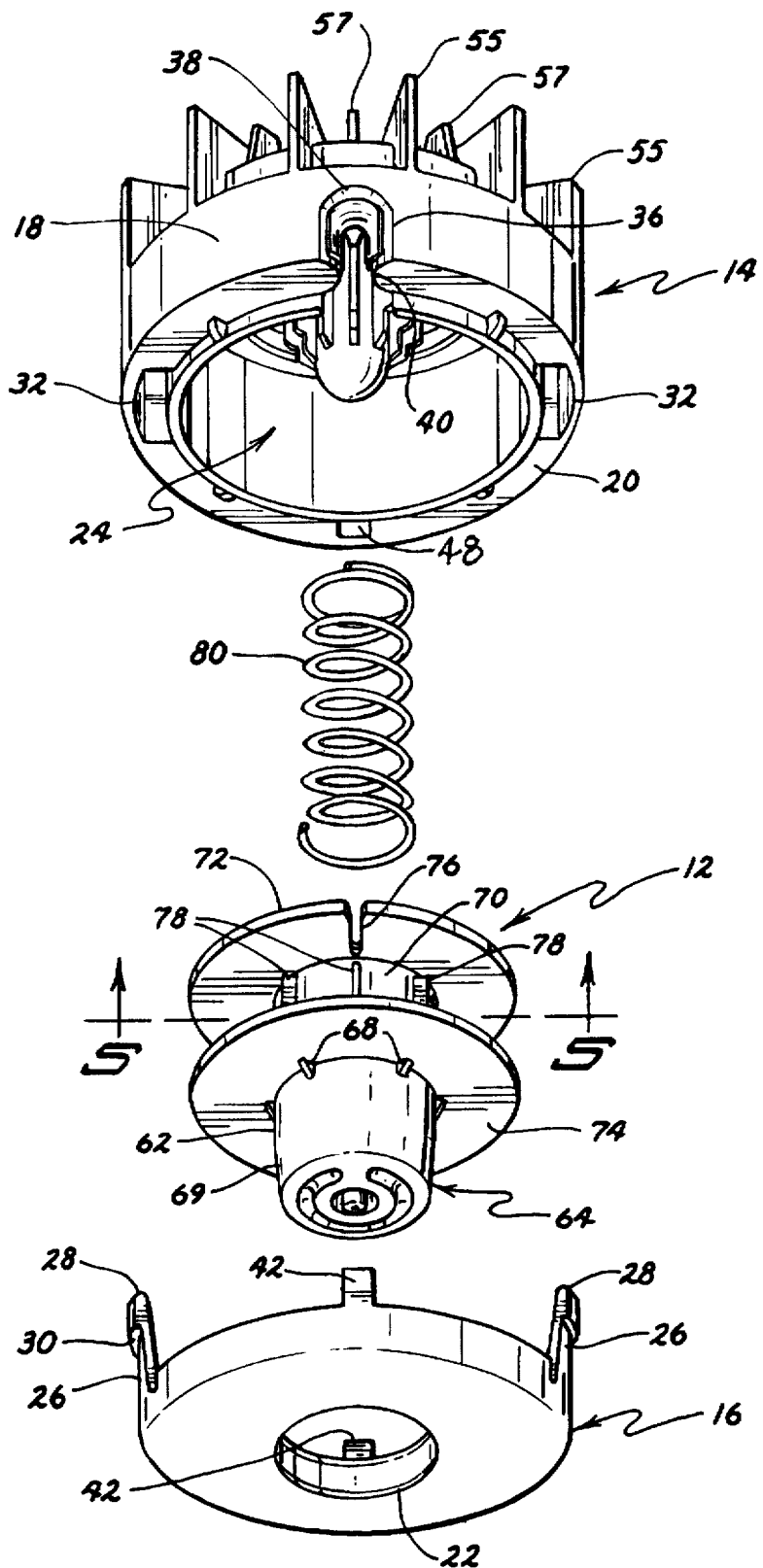
FIG. 4 is an exploded perspective view of the filament trimmer head shown in FIG. 1.

The two separable parts that comprise trimmer head 6 are a housing 14 and a separable cap 16. Referring to FIGS. 1, 4 and 6, housing 14 has an inverted, cup-shaped configuration that includes a closed upper end and a cylindrically shaped peripheral sidewall 18 that is at least a few inches deep and which terminates in an exterior lower edge 20. Cap 16 comprises a circular, generally flat, plate-like member that is separably attached to housing 14 and when so attached abuts against lower edge 20 of cylindrical sidewall 18. Cap 16 includes a circular opening 22 in the center thereof to allow a portion of spool 12 to protrude out of trimmer head 6 to allow this portion of spool 12 to be bumped or tapped on the ground to feed more line from spool 12. This line indexing operation, and the structure inside head 6 and on spool 12 for allowing this to occur, will be described in more detail hereafter.

When connected together, housing 14 and cap 16 form a substantially enclosed chamber or cavity 24 in which spool 12 is carried. Many ways of separably attaching cap 16 and housing 14 together could be used. However, one preferred method is to form cap 16 with a plurality of vertically extending flexible tangs 26 that are circumferentially spaced around the periphery of cap 16. Each tang 26 includes an outwardly extending hook 28 at its upper end having a downwardly facing hook surface 30. Sidewall 18 of housing 14 includes a plurality of vertical passages 32 that are equal in number to the number of tangs 26 and which are positioned around sidewall 18 to correspond to the spacing of tangs 26. Tangs 26 are formed such that the hooks 28 have a natural, radially outward bias to allow hooks 28 to snap into small windows (not shown) provided in sidewall 18 at the upper ends of passages 32.

Accordingly, housing 14 and cap 16 have a releasable snap fit connection with one another. To release cap 16 from housing 14, the user only has to press inwardly with his or her fingers through the windows on the sidewall 18 of housing 14 until the hooks 28 on tangs 26 are pressed radially inwardly a sufficient distance to disengage the hook surfaces 30 from the lower edge of the windows. The force of a spring 80, along with a downward pull on cap 16 if necessary, will move cap 16 downwardly to remove cap 16 from housing 14, thus opening up cavity 24 in which spool 12 is carried. Conversely, to reattach cap 16 to housing 14, the user need only circumferentially align tangs 26 with the location of the vertical passages 32 and push upwardly on cap 16 until the hooks 28 on the upper ends of tangs 26 reach the sidewall windows and snap radially outwardly.

The Exit Aperture

One novel feature of trimmer head 6 is the structure used to form an exit aperture 34 in sidewall 18 of housing 14. Aperture 34 allows the filament line 8 on spool 12 to be easily threaded through aperture 34 when cap 16 is removed from housing 14. However, during operation of trimmer 2, aperture 34 otherwise relatively closely constrains the line 8 against any substantial vertical up and down movement to prevent friction and abrasion of line 8 against aperture 34 and thereby help prevent line 8 from melting or breaking at the aperture. This is accomplished without any steps required by the user other than for having to remove and then reattach cap 16 to housing 14.

Exit aperture 34 comprises a vertical, U-shaped slot 36 in sidewall 18 of housing 14. Slot 36 has the closed end 38 of the U located in the interior of sidewall 18 with slot 36 extending downwardly from there such that the open end 40 of the U is located at lower edge 20 of sidewall 18. See FIG. 4. Thus, when cap 16 is not connected to housing 14, slot 36 is effectively open at the bottom thereof, i.e. at the open end 40 of the U, to allow the user to place the filament line 8 into slot 36 without having to try and thread line 8 through an enclosed circular aperture located in the middle of sidewall 18. However, exit aperture 34 is completed and becomes substantially enclosed to surround line 8 and prevent line 8 from falling out of slot 36 when cap 16 is reattached to housing 14. Cap 16 will then extend over and close off the open end 40 of slot 36 to thereby form an enclosed exit aperture 34.

Referring again to FIG. 6, it is preferred that line 8 exit from a point in the interior of sidewall 18, and preferably from about the midpoint of sidewall 18, because this will center exit aperture 34 over the depth of the line storage area on spool 12. In other words, as line 8 pays out from the top to the bottom of its supply 9, the maximum angle formed between line 8 and exit aperture 34 is about the same whether line 8 is paying out of the top rung of the coiled supply 9 or the bottom rung of supply 9. This is a reason for extending the top of slot 36, i.e. the closed end 38 of the U, up into the interior of sidewall 18 to approximately the midpoint of sidewall 18.

However, in doing so, the otherwise open length of slot 36 is substantially longer than the diameter of line 8, on the order of 7 to 9 times longer than the line diameter. This extended slot length provides too much room for line 8 to vibrate up and down in slot 36 during operation of trimmer 2. This vibration and vertical movement can lead to unnecessarily short line life due to undesirable friction and melting of line 8 at aperture 34 or due to abrasion of line 8 with breakage of line 8 at aperture 34.

Trimmer head 6 of this invention avoids this result by shortening the length of slot 36, or by filling in approximately half the length of slot 36, to form, in effect, an aperture 34 having a length only slightly greater than the diameter of line 8, preferably from about 3 to 4 times the diameter of line 8. This is most easily done by forming an upwardly extending tab 42 on cap 16 which tab 42 is located to be received inside slot 36 when cap 16 is snapped onto housing 14. The height of tab 42 is chosen so that the upper face 44 of tab 42 is spaced beneath closed end 38 of the U-shaped slot 36 by the required amount. In a trimmer with line 8 having a diameter of 0.065 inches, slot 6 when unobstructed by tab 42 has a length of approximately 0.500 inches and when obstructed by tab 42 has a length of approximately 0.250 inches.

Tab 42 is effective to prevent excessive vertical vibration and movement of line 8 in slot 36 and thereby extends the life of line 8. Another desirable result achieved from using tab 42 is that line 8 is prevented from wedging in any gap at the bottom of slot 36 that might be present between cap 16 and lower edge 20 of housing sidewall 18. Tab 42 simply keeps line 8 spaced up above the junction between cap 16 and sidewall 18. This invention provides an exit aperture 34 that can be opened up, by removing cap 16, to allow line 8 to be easily slipped into aperture 34, but which can thereafter be closed to form an enclosed aperture around line 8 which prevents excessive vertical line movement simply by snapping cap 16 into place on housing 14.

Figure 8:
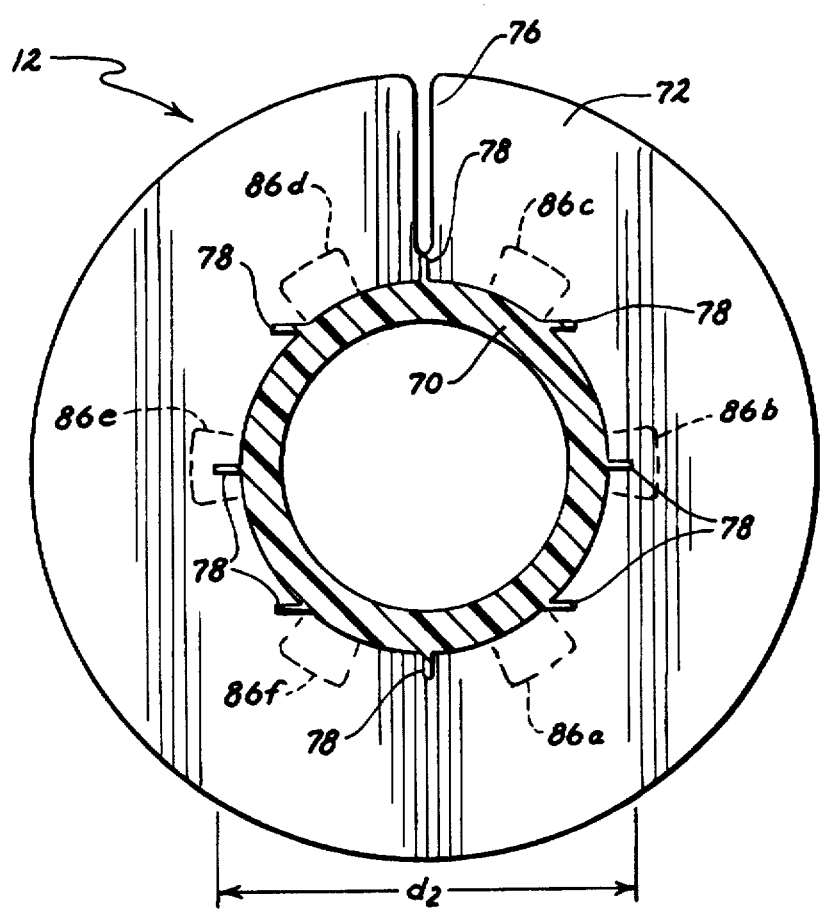
FIG. 8 is an enlarged cross-sectional view of a portion of the peripheral sidewall of the filament trimmer head shown in FIG. 1, particularly illustrating the line exit aperture used in the head sidewall.
Figure 8:
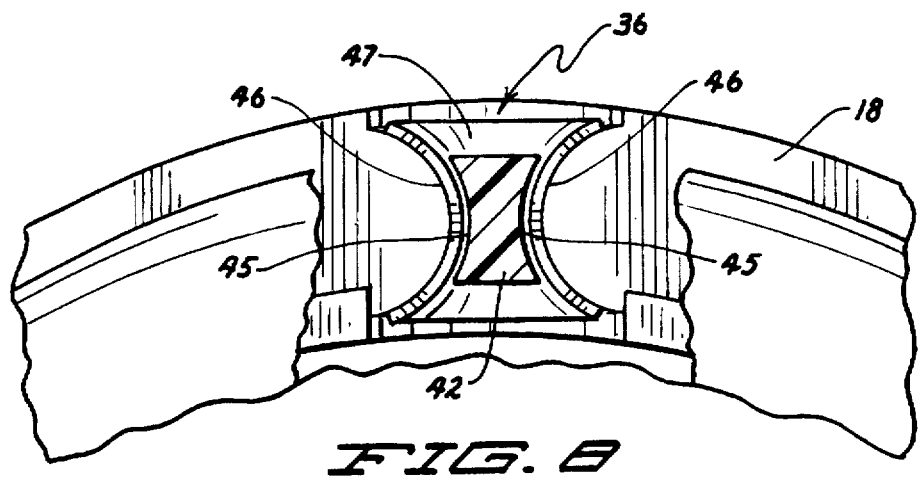

Referring now to FIG. 8, the vertical sides 46 of exit aperture 34 preferably have a curved configuration to provide curved bearing surfaces for line 8 as it extends out through exit aperture 34. Preferably, exit aperture 34 is formed by integrally molding into sidewall 18 a slot 36 of the appropriate configuration and by then press fitting into that slot 36 a U-shaped metal insert 47 that provides metallic bearing surfaces for the filament line. However, exit aperture 34 could simply comprise a slot 36 molded into sidewall 18 of trimmer head 6 without using metallic insert 47 in slot 36. Trimmer head 6 is preferably molded from any suitably hard plastic material.

Referring again to FIG. 8, the side surfaces 45 of the line constraining tab 42 received inside slot 36 preferably should be shaped to correspond to and match the shape of sides 46 of slot 36. Thus, when an exit aperture 34 having curved sides 46 is used, as is the case here, side surfaces 45 of tab 42 should also be similarly curved to closely lie adjacent to sides 46 of slot 36. This minimizes any vertical gaps that might occur between side surfaces 45 of tab 42 and vertical sides 46 of slot 36 to prevent line 8 from being extruded into or getting pinched in these gaps. Thus, in addition to having the required height needed to fill in the length of slot 36, tab 42 should be sized to be closely received across the width of slot 36 with the side surfaces of tab 42 having matching configurations to the vertical sides 46 of slot 36.

Desirably, cap 16 includes two tabs 42, spaced circumferentially apart by 180°, to ease the task of aligning tab 42 with slot 36, and to provide some balance to cap 16. In this regard, the tab 42 on the other side of cap 16 is received in a vertically extending, enclosed pocket 48 that is formed in sidewall 18 of housing 14. Tabs 42 are identical, however, so that either tab 42 may be received in the aperture forming U-shaped slot 36. Thus, cap 16 can be snapped up onto the lower end of housing 14 in two different positions with one tab 42 being received in slot 36 and the other tab 42 being received in enclosed pocket 48. See FIG. 6.

The Drive Shaft Attachment

Trimmer head 6 has to be secured to a downwardly extending drive shaft 50 that is used to rotate trimmer head 6. In an electrically powered trimmer 2, an electric drive motor is often mounted on the lower end of trimmer 2 in a housing immediately above trimmer head 6. In this case, drive shaft 50 comprises the vertically extending motor shaft of the electric motor. In a gasoline engine powered trimmer, the gasoline engine is often mounted at the top end of the trimmer and a long drive coupling member, or series of drive coupling members, extends down from the engine to connect to the trimmer head 6. Thus, the phrase "drive shaft" as used herein is simply meant to refer to that shaft-like element that attaches to trimmer head 6, whether that be the motor shaft of an electrically powered trimmer or the lowermost drive coupling member in a gasoline powered trimmer.

In known filament trimmers, the drive connection is often made by providing a threaded bore in the top of the trimmer head which screws onto a threaded drive shaft. In some cases, the threaded bore is provided by threads that are integrally molded into the trimmer head. In other cases, a separate threaded insert, often made of metal, is provided. This insert, which is usually a separate part, has to be electrically insulated. This is done by first molding the insert into a separate plastic part in a separate molding operation. The plastic part carrying the insert is then fixed into the trimmer head to receive the threaded drive shaft. However, the need to provide these threaded bores in the trimmer head increases the cost of the trimmer head.

Trimmer head 6 of this invention utilizes an improved, less expensive, way of connecting trimmer head 6 to drive shaft 50. It comprises an elongated, downwardly extending hub 52 in the center of the top end of housing 14. Hub 52 is molded to have a smooth, vertically extending, cylindrical bore 54 that is integrally molded into hub 52 when housing 14 is molded. Bore 54 is provided with an inner diameter of a predetermined value, e.g. a nominal inner diameter of 0.270 inches, which is indicated in FIG. 6 as $d_1$.

Figure 7:
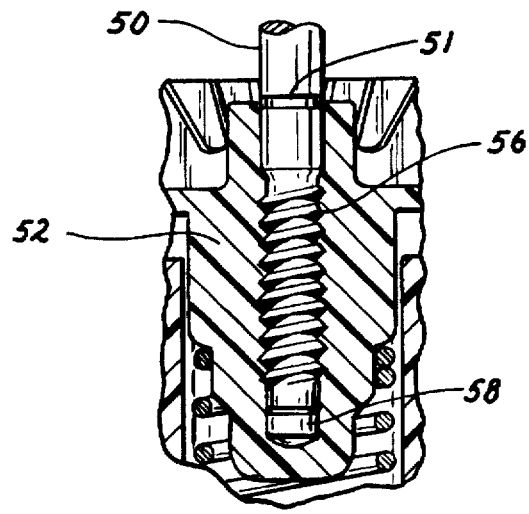
FIG. 7 is a partial cross-sectional view of a portion of the filament trimmer head shown in FIG. 1, particularly illustrating the attachment of the head to the motor shaft.

Referring now to FIG. 7, the lower end of drive shaft 50 includes a threaded section 56 made of thread forming screw threads, e.g. such as those known by the tradename of plastite. The outer diameter of threaded section 56 is significantly greater than, e.g. approximately twenty to forty thousandths of an inch greater than, inner diameter $d_1$ of bore 54. Thus, when threaded section 56 is threaded down into smooth bore 54, the oversized thread forming screw threads on section 56 will deform the plastic material comprising hub 52 to form the screw threads needed to receive threaded section 56. This is done at the same time as trimmer head is being affixed to drive shaft 50.

It is preferred that the very bottom of drive shaft 50 be formed with a cylindrical pilot portion 58 having an outer diameter that is approximately the same as, e.g. a nominal outer diameter that is the same or is a few thousandths of an inch greater or less than, inner diameter $d_1$ of bore 54. In addition, it is also preferred that threaded section 56 be made with a two lead thread. Using a two lead thread helps to insure that the threaded section 56 is properly aligned on lower end of drive shaft 50 when the threads comprising section 56 are rolled onto the lower end of drive shaft 50 during manufacture thereof. The pilot portion 58 will travel down bore 54 in advance of threaded section 56. The purpose of using both of these elements, namely both pilot portion 58 and the two lead thread on threaded section 56, is to properly align housing 14 on drive shaft 50 when housing 14 is being threaded onto drive shaft 50.

By providing only a smooth bore 54 in hub 52 of housing 14 during manufacture of housing 14, the cycle times for molding housing 14 can be greatly increased as there is no need to spin housing 14 off a screw forming mandrel before pulling it out of the mold. Instead, smooth bore 54 is simply molded in hub 52 when housing 14 is molded. This can be done without decreasing the mold cycle times otherwise needed to mold housing 14, and reduced tool costs and maintenance should also result. Thus, bore 54 can be molded into housing 14 with very little, if any, increase in cost. Moreover, there is obviously no need to provide a separate threaded insert for use in the housing and to mold this insert into the housing or into a separate molded part.

The attachment of trimmer head 6 to drive shaft 50 is made, and the simultaneous formation of the necessary screw threads in hub 52 occurs, when trimmer head 6 is threaded onto drive shaft 50. This is done during manufacture of trimmer 2 with pilot portion 58 being first received in bore 54 and with threaded portion 56 serving to bite into and rigidly affix drive shaft 50 to housing 14 due to the oversized nature of the threads relative to bore 54. A groove 51, or some other visual mark or indicia, can be placed on the exterior of the lower end of drive shaft 50 as an aid in the manufacture of trimmer head 6. Drive shaft 50 is fully inserted into hub 52 when groove 51 becomes centered on the top surface of hub 52 (as shown in FIG. 7) which signals to the assembler that head 6 is completely threaded onto drive shaft 50 and the threading of head 6 onto drive shaft 50 should be stopped. Pilot portion 58 and the use of a two lead thread help provide the necessary alignment and guidance to ensure that housing 14 threads onto drive shaft 50 straight and is not canted at an angle during the threading operation. Accordingly, trimmer head 6 of this invention is less expensive to manufacture and assemble because there is no need to provide threads in bore 54 prior to the time head 6 is threaded onto drive shaft 50.

Trimmer head 6 is built such that drive shaft 50 is not specially protected or enclosed inside a motor bracket or inside recessed portions of housing 14 as drive shaft 50 extends between the lower portion of trimmer 2 and head 6. Instead, drive shaft 50 comprises an exposed metal shaft that simply extends down into trimmer head 6 from the lower portion of trimmer 2. When trimmer 2 is an electrically powered trimmer, drive shaft 50 normally comprises the motor shaft of the electric motor which rotates head 6. This electric motor is normally housed in the lower portion of trimmer 2 immediately above head 6.

When trimmer 2 is an electrically powered trimmer, a first set of radial cooling fins 55 are normally provided on top of head 6 for generating an air flow that cools the electric drive motor. In addition, trimmer head 6 of this invention comprises a second set of radial fins 57 that are shorter than first fins 55 with the second fins 57 being interposed between adjacent ones of the first fins 55. Together, fins 55 and 57 are sufficiently close together to prevent the fingers of the user, which are simulated by a quarter inch probe in a known test that is performed on these types of products, from being inserted into the gap between the top of head 6 and the bottom of the lower portion of trimmer 2 and touching the exposed motor shaft 50 of such an electric trimmer. Thus, the safety of head 6 is enhanced simply by appropriately spacing fins 55 and 57 on the top of trimmer head 6.

The Dirt Seal

Figure 9:
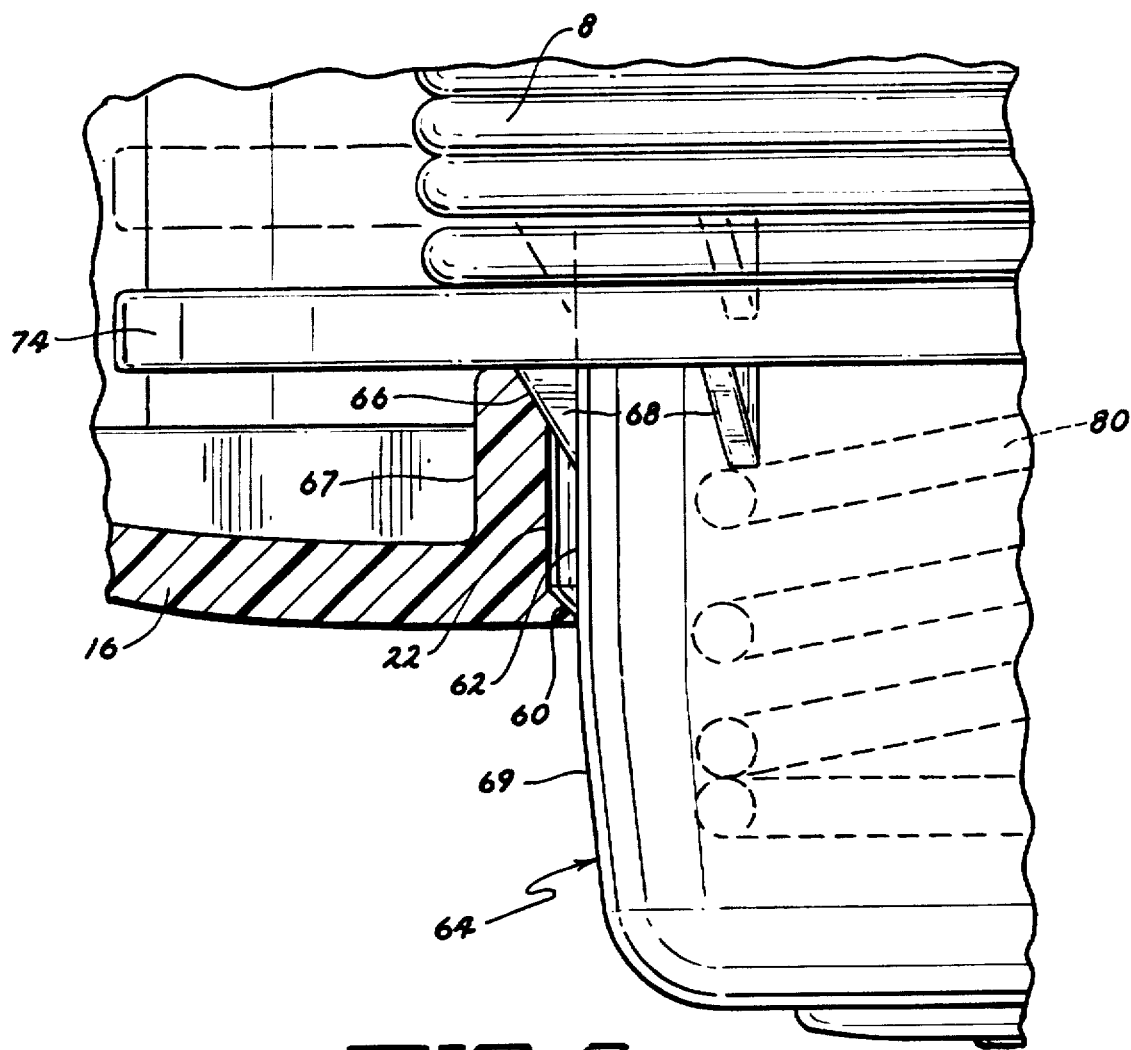
FIG. 9 is an enlarged cross-sectional view of a portion of the filament trimmer head shown in FIG. 1, particularly illustrating the dirt seal used at the bottom of the head to help prevent the entry of dirt, sand, and the like into the head.

Referring now to FIG. 9, trimmer head 6 further includes means for preventing dirt, sand and similar debris from entering into trimmer head 6 through opening 22 in cap 16. This means includes a triangularly shaped, knife edged dirt seal 60 which extends radially inwardly from the inner diameter of opening 22 towards a cylindrical portion 62 of an outer peripheral wall of a ground bump button 64 on spool 12. Dirt seal 60 is preferably integrally molded into cap 16 in the form of an annular flange which comes to a sharp point at its radially innermost edge (i.e. about 0.010 inches thick at its radially innermost edge which is about as sharp as it can be molded). Dirt seal 60 is also preferably positioned adjacent the bottom face of cap 16 at the lowermost edge of opening 22.

The purpose of dirt seal 60 is to cut down the normal gap or distance between opening 22 and cylindrical wall portion 62 of ground bump button 64 by at least 50%, and preferably by at least 75%, such that the remaining gap is only a few thousandths of an inch wide. This prevents the easy entry of dirt, sand or similar debris into trimmer head 6 through opening 22 and helps to prevent the wedging of sand or dirt particles between cap 16 and spool 12. In addition, seal 60 has a wiping action relative to ground bump button 64 that will tend to wipe away any debris particles as ground bump button 64 moves up and down relatively to trimmer head 6 during a line indexing operation.

Dirt seal 60 is preferably integrally molded as part of cap 16 for ease of manufacture and for cost reasons, and thus will be made from the usual plastic materials typically used in filament trimmer heads. Because seal 60 is rigid and approaches to within a few thousandths of cylindrical wall portion 62, it is preferred that some means be used to help center ground bump button 64 within opening 22 to keep ground bump button 64 from periodically wobbling into engagement with or otherwise contacting dirt seal 60 during operation of trimmer 2. Engagement between ground bump button 64 and seal 60 would potentially chip or wear away dirt seal 60 lessening its usefulness, or might score or damage ground bump button 64.

The centering means comprises an annular, upwardly facing chamfered shoulder 66 provided on an annular shell 67 in the interior of cap 16 surrounding opening 22. A plurality of chamfered, triangular ribs 68 are provided on the upper portion of cylindrical wall portion 62 of ground bump button 64. See FIG. 4 as well as FIG. 9. Ribs 68 have an angle that matches the angle of chamfered shoulder 66. Ribs 68 will engage against chamfered shoulder 66 when ground bump button 64 is in its lowermost position during normal operation of trimmer 2 to help keep button 64 properly centered within dirt seal 60. In this regard, ribs 68 are preferred over a downwardly facing, annular surface on spool 12 because such ribs 68 will better prevent any sand or dirt particles that might get past dirt seal 60 form binding between spool 12 and chamfered shoulder 66.

The centering effect of shoulder 66 and ribs 68 is lost when ground bump button 64 is raised during a line indexing operation. However, the outer peripheral wall of button 64 has an inwardly tapered, conical lower end 69 which tends to slightly increase the gap between seal 60 and button 64 when button 64 is in contact with the ground and is raised relative to cap 16. Thus, less centering is needed in this raised condition of button 64, and button 64 is raised in a line indexing operation only rarely during normal operation of trimmer 2.

The Spool

Spool 12 comprises means for carrying or retaining the supply 9 of filament line 8. Spool 12 includes a cylindrical core 70 on which line 8 is wound to form a coiled supply 9 having multiple turns on core 70. The outer or free end of line 8 extends radially outwardly from core 70 through exit aperture 34 to form the cutting length 10 of line 8. While core 70 preferably is cylindrically shaped and is formed by an imperforate solid wall, any core defining shape or structure which allows line 8 to be wound thereon could be used.

Spool 12 includes top and bottom spool flanges 72 and 74 between which the turns of the stored filament line 8 are received. Spool flanges 72 and 74 are circular and are approximately the same size, each being slightly smaller than the inside diameter of spool receiving cavity 24 provided inside trimmer head 6. Ground bump button 64 extends integrally downwardly from bottom spool flange 74 to extend out through opening 22 in trimmer head 6 past dirt seal 60. Top spool flange 72 includes a radial slot 76 which receives and holds the radial outer end of line 8 to prevent the uncoiling of line 8 from spool 12 prior to the time line 8 is threaded through aperture 34. Spool 12 is integrally molded as a single unit from a suitably hard and durable plastic material.

Spool 12 of this invention includes means for absorbing any radially inward forces that might be imposed by filament line 8 on core 70 of spool 12. Nylon filament line of the type commonly used in filament trimmers is susceptible to environmental conditions, particularly to the humidity in the air as such line is somewhat hygroscopic, and can expand or contract with changes in these conditions. If line 8 contracts because of such conditions, it can sometimes squeeze inwardly on core 70 with sufficient force that it deforms spool 12 causing spool flanges 72 and 74 to warp out of their normal horizontal orientations or potentially can even damage spool core 70 due to high stress. This invention provides means for absorbing this compressive force to avoid these consequences.

The force absorbing means utilized in this invention comprises a plurality of crush ribs 78 that are integrally molded onto spool core 70 between the upper and lower flanges 72 and 74 of spool 12. Crush ribs 78 extend vertically and are spaced circumferentially around spool core 70. Referring to FIG. 5, ribs 78 are quite thin in relation to the thickness of spool core 70 and are deformable under the types of compression forces that might be caused by the contraction of line 8 on spool core 70. The deformation of these crush ribs 78 prevents these forces from warping or damaging spool 12, thus contributing to the life of spool 12 and to the continued proper operation of trimmer head 6.

The Line Indexing Means

Trimmer head 6 includes means for allowing the filament line to be periodically indexed or fed out of trimmer head 6 to replenish and extend the cutting length 10 of line 8 outside of trimmer head 6. This must periodically be done during operation of trimmer 2 because line 8 will sometimes break or gradually wear away due to contact with the ground, with trees, or the like.

The indexing means of this invention is of the well known ground bump type. It includes a spool 12 that is movable vertically inside trimmer head 6 between a lowered position, shown in solid lines in FIG. 6, and a raised position, shown in phantom lines in FIG. 6. A spring 80 is used inside head 6 to normally bias spool 12 to its lowered position. However, if the filament trimmer 2 is tapped on the ground by the user, the engagement of ground bump button 64 with the ground will move spool 12 upwardly relative to trimmer head 6 to its raised position. When head 6 is lifted up off the ground, spring 80 is effective to move it back down to its lowered position.

Figure 2:
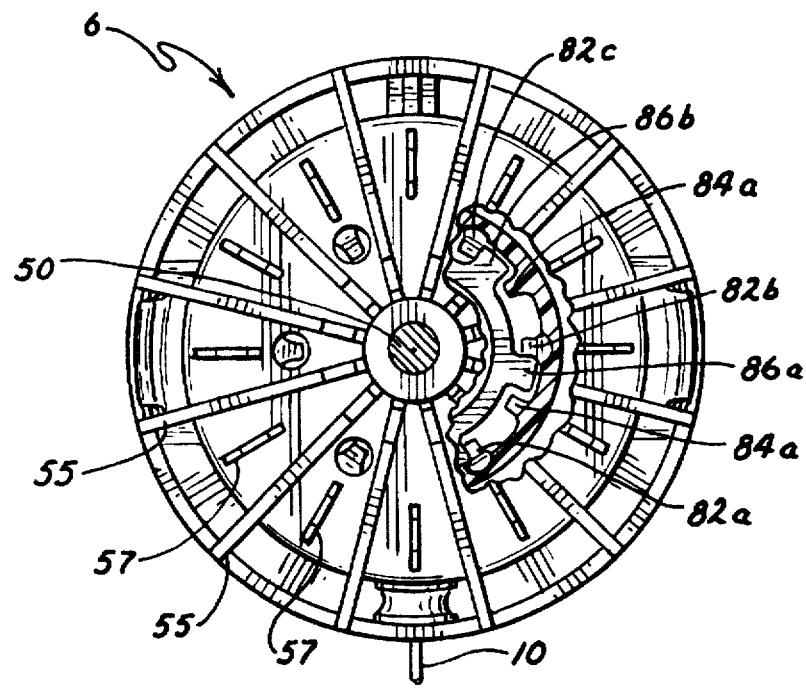
FIG. 2 is a cross-sectional view taken along lines 2—2 of FIG. 1, particularly illustrating the top of the filament trimmer head shown in FIG. 1. with a portion thereof broken away to illustrate some of the locking and indexing teeth in the line indexing system used in the head.
Figure 3:
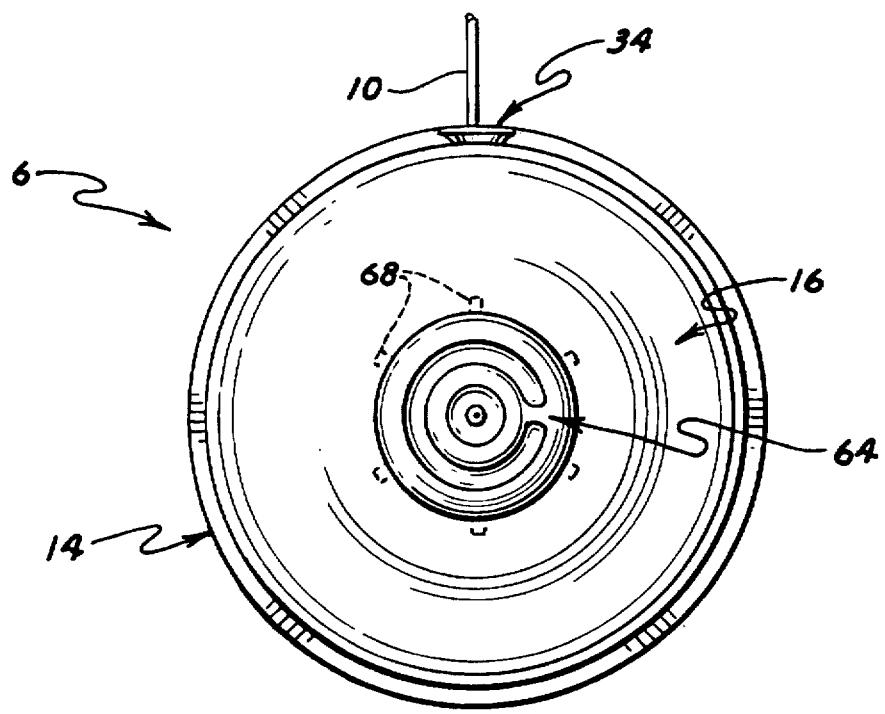
FIG. 3 is a bottom plan view of the filament trimmer head shown in FIG. 1.

Trimmer head 6 and spool 12 are provided with two groups of teeth that rotationally lock spool 12 and trimmer head 6 relative to one another in both the lowered and the raised positions of spool 12. Either trimmer head 6 or spool 12 can integrally carry the first group of teeth. This group comprises two sets 82 and 84 of circumferentially spaced indexing teeth with the teeth 82a, 82b, 82c, etc. in the first set 82 being rotationally offset relative to the teeth 84a, 84b, etc. in the second set 84. See FIG. 2. The teeth in the first set 82 are also vertically offset relative to the teeth in the second set 84. See FIG. 6.

Whichever one of trimmer head 6 or spool 12 does not carry the first group of teeth, namely the first and second sets 82 and 84 of indexing teeth, will carry the second group of teeth used in the indexing means. This second group of teeth comprises at least one set 86 of circumferentially spaced locking teeth 86a, 86b, 86c, etc. See FIGS. 2, 5 and 6. The locking teeth set 86 engage against the first set 82 of indexing teeth in the lowered position of spool 12 to rotationally fix spool 12 and trimmer head 6 against rotation relative to one another. In addition, the locking teeth set 86 also engage against the second set 84 of indexing teeth in the raised position of spool 12 to again rotationally fix spool 12 and trimmer head 6 against rotation relative to one another.

In trimmer 2 of this invention, the second group of teeth in the indexing means, namely the set 86 of locking teeth, are integrally molded on spool 12 and the first group of teeth in the indexing means, namely the vertically and rotationally staggered sets 82 and 84 of indexing teeth, are integrally molded in housing 14 of trimmer head 6. However, this could be reversed if so desired. The single set 86 of locking teeth in the first group could be integrally molded into housing 14 of trimmer head and the two sets 82 and 84 of indexing teeth in the second group could be integrally molded as part of spool.

A novel feature of this invention is that the teeth in whatever group is carried by spool 12 are not molded as part of either spool flange 72 or 74, but are molded into an extension 90 of spool core 70 to be vertically spaced from spool flanges 72 or 74. Thus, as shown in FIG. 6, the locking teeth 86a, 86b, 86c in the second group of teeth are located above top spool flange 72 for engagement with the sets 82 and 84 of indexing teeth that are similarly located above top spool flange 72. The teeth 86 carried on spool 12 preferably simply extend radially outwardly from spool core extension 90 as shown in the drawings. Alternatively, these teeth could be formed around the periphery of a short, horizontal, annular flange that protrudes radially outwardly from spool core extension 90.

Whichever is the case, the array of teeth carried on spool 12 preferably has an outer diameter, indicated as $d_2$ in FIG. 5, that is significantly less than the diameter of spool flanges 72 or 74. The teeth carried by housing 14, namely the indexing teeth sets 82 and 84, are also preferably located radially inwardly of the periphery of spool flanges 72 or 74. See FIG. 6. This allows the diameter of spool 12 to be kept to a minimum since none of the teeth comprising the indexing means extend radially outwardly past the outer peripheral edges of spool flanges 72 or 74. It also prevents any possibility that line 8 extending outwardly from spool 12 will catch or tangle on any of the teeth in the indexing means.

Forming at least one of the groups of teeth required for the indexing means directly on spool 12 decreases the cost of trimmer head 6 since a separate tooth carrying element is no longer required. Not using spool flanges 72 or 74 to carry the teeth provided on spool 12 and placing such teeth vertically away from spool flanges 72 or 74 allows these teeth to remain in a proper horizontal orientation even if the adjacent spool flange warps or bends to some degree. Keeping the outer diameter $d_2$ of these teeth to a value which is only slightly greater than spool core 70 and is significantly less than the diameter of spool flanges 72 or 74 enhances the strength of these teeth and decreases any possibility that they themselves might warp or bend. Thus, the indexing system of this invention is less expensive to manufacture than prior known systems in which these teeth are placed on a separate element, and are more reliable in operation than prior known systems in which these teeth are carried on the spool flanges.

The indexing means of this invention works in the manner that is well known for ground bump systems. It basically allows spool 12 and trimmer head 6 to rotate relative to one another during those times when spool 12 and trimmer head 6 are unlocked, i.e. when spool 12 is moving between its lowered position and its raised position and vice versa. For example, a first increment of line is fed out when ground bump button 64 is bumped on the ground to raise spool 12 and the locking teeth in set 86 disengage the indexing teeth in the first set 82. Spool 12 is then unlocked relative to head 6 so that centrifugal force acting on line 8 is effective to rotate spool 12 during the time before the locking teeth in set 86 reengage against the indexing teeth in the second set 84. The increment of the line that is extended is equal to the amount of the angular offset between the indexing teeth in the two sets 82 and 84.

Similarly, a second increment of line is fed out during downward spool movement when ground bump button 64 is lifted off the ground and the locking teeth set 86 disengages the indexing teeth in the second set 84 and reengages against the indexing teeth in the first set 82.

Many of the features of trimmer head 6 as disclosed herein can be used independently of one another. For example, the force absorbing means comprising crush ribs 78 can be used on any spool that stores filament line that is subject to contraction, whether or not such spool is used in conjunction with a ground bump indexing system or even with any indexing system that feeds line out while the trimmer is operating. Similarly, the novel exit aperture 34 can be used in filament trimmers having conventional line storage spools and regardless of whether any line indexing system is used. Accordingly, the scope of this invention is to be limited only by the appended claims.

We claim:

1. An improved filament trimmer of the type having a trimmer head, a spool having a spool core and upper and lower spool flanges extending radially outwardly from the core to define a line storage area between the spool flanges with the spool flanges having outermost peripheral edges, a supply of filament line wound around the core and located in the line storage area of the spool with a free end of the line extending radially outwardly from the spool to form a cutting length of line located exteriorly of the head, drive means for rotating the trimmer head about an axis to cause the cutting length of line to be spun in a cutting plane to sever vegetation, and indexing means for feeding additional line out from the spool, wherein the indexing means includes a first group of indexing teeth comprising first and second sets of indexing teeth that are spaced apart relative to one another along the axis of rotation, the indexing teeth in each set thereof being circumferentially spaced apart relative to one another and the indexing teeth in the first and second sets thereof being circumferentially offset relative to one another, the indexing means further including a second group of locking teeth comprising at least one set of locking teeth in which the locking teeth are circumferentially spaced apart relative to one another, the locking teeth in the second group being alternately engageable with the indexing teeth in the first and second sets of indexing teeth in the first group in response to relative reciprocal motion along the axis of rotation between the first and second groups of teeth, wherein the improvement relates to the indexing means and comprises:

(a) the spool including a core extension attached to the spool core and which vertically protrudes past the spool flanges such that the core extension is located vertically outside of the line storage area of the spool;

(b) wherein one of the two groups of teeth in the indexing means is carried by and integrally formed on the core extension and is vertically spaced from the spool flange closest to the one group of teeth carried by the core extension, wherein the teeth in the one group of teeth carried by the core extension extend radially outwardly from the core extension but do not extend radially outwardly past the outermost peripheral edges of the spool flanges; and (c) wherein the spool including the spool core, the spool flanges, the core extension and the one group of teeth carried by the core extension are integrally molded in one piece from a plastic material.

2. An improved filament trimmer as recited in claim 1, wherein the spool core has a predetermined outside diameter, and wherein the core extension has an outside diameter that is generally the same as the outside diameter of the spool core.

3. An improved filament trimmer as recited in claim 1, wherein the spool core is hollow having a predetermined wall thickness, and wherein the core extension is hollow having a wall thickness which is generally the same as the wall thickness of the spool core.

4. An improved filament trimmer as recited in claim 1, wherein the teeth in the one group of teeth carried by the core extension are substantially parallel to the spool flanges.

5. An improved filament trimmer as recited in claim 1, wherein the other group of teeth are carried in the trimmer head, extend radially inwardly relative to the spool core, and are positioned radially inwardly from the outermost peripheral edges of the spool flanges to minimize the size of the spool.

6. An improved filament trimmer of the type having a trimmer head, a spool having a spool core and upper and lower spool flanges extending outwardly from the core to define a line storage area between the spool flanges, a supply of filament line wound around the core and located in the line storage area of the spool with a free end of the line extending radially outwardly from the spool to form a cutting length of line located exteriorly of the head, drive means for rotating the trimmer head about an axis to cause the cutting length of line to be spun in a cutting plane to sever vegetation, and indexing means for feeding additional line out from the spool, wherein the indexing means includes a first group of indexing teeth comprising first and second sets of indexing teeth that are spaced apart relative to one another along the axis of rotation, the indexing teeth in each set thereof being circumferentially spaced apart relative to one another and the indexing teeth in the first and second sets thereof being circumferentially offset relative to one another, the indexing means further including a second group of locking teeth comprising at least one set of locking teeth in which the locking teeth are circumferentially spaced apart relative to one another, the locking teeth in the second group being alternately engageable with the indexing teeth in the first and second sets of indexing teeth in the first group in response to relative reciprocal motion along the axis of rotation between the first and second groups of teeth, wherein the improvement relates to the indexing means and comprises:

(a) the spool having a tubular member having upper and lower ends, wherein the spool flanges are located on the tubular member between the upper and lower ends thereof such that a middle portion of the tubular member is located between the spool flanges to form the spool core, an upper portion of the tubular member extends above the upper spool flange to form an extension of the spool core, and a lower portion of the tubular member extends below the lower spool flange;

(b) wherein one of the two groups of teeth in the indexing means is carried on the core extension formed by the upper portion of the tubular member to be vertically spaced above the upper spool flange, wherein the teeth in the one group of teeth carried by the core extension are substantially parallel to the upper spool flange and are located radially inwardly from an outermost peripheral edge of the upper spool flange; and (c) wherein the lower portion of the tubular member has a closed lower end forming a ground bump member that is bumped against the ground to initiate line indexing.

7. An improved filament trimmer as recited in claim 6, wherein the teeth in the one group of teeth carried by the core extension overlie the upper spool flange.

8. An improved filament trimmer of the type having a trimmer head, a spool having a spool core and upper and lower spool flanges extending radially outwardly from the core to define a line storage area between the spool flanges with the spool flanges having outermost peripheral edges, a supply of filament line wound around the core and located in the line storage area of the spool with a free end of the line extending radially outwardly from the spool to form a cutting length of line located exteriorly of the head, drive means for rotating the trimmer head about an axis to cause the cutting length of line to be spun in a cutting plane to sever vegetation, and indexing means for feeding additional line out from the spool, wherein the indexing means includes a first group of indexing teeth comprising first and second sets of indexing teeth that are spaced apart relative to one another along the axis of rotation, the indexing teeth in each set thereof being circumferentially spaced apart relative to one another and the indexing teeth in the first and second sets thereof being circumferentially offset relative to one another, the indexing means further including a second group of locking teeth comprising at least one set of locking teeth in which the locking teeth are circumferentially spaced apart relative to one another, the locking teeth in the second group being alternately engageable with the indexing teeth in the first and second sets of indexing teeth in the first group in response to relative reciprocal motion along the axis of rotation between the first and second groups of teeth, wherein the improvement relates to the indexing means and comprises:

(a) the spool including a core extension attached to the spool core and which vertically protrudes past the spool flanges such that the core extension is located vertically outside of the line storage area of the spool, wherein the spool core has a predetermined outside diameter, and wherein the core extension has an outside diameter that is generally the same as the spool core; and (b) wherein one of the two groups of teeth in the indexing means is carried by and integrally formed on the core extension and is vertically spaced from the spool flange closest to the one group of teeth carried by the core extension, wherein the teeth in the one group of teeth carried by the core extension extend radially outwardly from the core extension but do not extend radially outwardly past the outermost peripheral edges of the spool flanges.

\* \* \* \* \*